(12) United States Patent
Luo et al.

(10) Patent No.: US 11,397,754 B2
(45) Date of Patent: Jul. 26, 2022

(54) CONTEXT-BASED KEYWORD GROUPING

(71) Applicant: International Business Machines Corporation, Armonk, NY (US)

(72) Inventors: Yan Luo, Concord (CA); Rahamim Katan, Modiin (IL); Gary Mazo, San Jose, CA (US); Monvorath Phongpaibul, Bangkok (TH); Tala El Hallak, Toronto (CA); Stanislav Georgiev, Thornhill (CA); Hongxia Li, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 271 days.

(21) Appl. No.: 16/790,984

(22) Filed: Feb. 14, 2020

(65) Prior Publication Data

US 2021/0256036 A1 Aug. 19, 2021

(51) Int. Cl.
*G06F 16/28* (2019.01)
*G06F 40/295* (2020.01)
*G06F 16/25* (2019.01)
*G06F 8/70* (2018.01)

(52) U.S. Cl.
CPC .......... *G06F 16/285* (2019.01); *G06F 16/252* (2019.01); *G06F 40/295* (2020.01); *G06F 8/70* (2013.01)

(58) Field of Classification Search
CPC .... G06F 16/285; G06F 16/252; G06F 40/295; G06F 8/70; G06F 40/30; G06F 16/355; G06F 16/358; G06F 3/0482; G06F 40/284; G06F 16/532; G06K 9/6267; G06K 9/726; G06N 20/00; G06N 5/003; G06N 5/02; G06N 5/048; G06N 7/005
USPC ........................................................ 707/739
See application file for complete search history.

(56) References Cited

U.S. PATENT DOCUMENTS

| | | | |
|---|---|---|---|
| 8,498,985 B2 | 7/2013 | Spence et al. | |
| 9,361,648 B2 | 6/2016 | Burckart et al. | |
| 9,514,124 B2 | 12/2016 | Allen et al. | |
| 2008/0005137 A1* | 1/2008 | Surendran | G06K 9/6226 |
| 2009/0319544 A1 | 12/2009 | Griffin et al. | |
| 2012/0143911 A1* | 6/2012 | Liebald | G06F 16/337 |
| | | | 707/771 |
| 2013/0268916 A1* | 10/2013 | Misra | G06F 8/73 |
| | | | 717/123 |
| 2017/0004129 A1* | 1/2017 | Shalaby | G06F 16/367 |

(Continued)

FOREIGN PATENT DOCUMENTS

| | | |
|---|---|---|
| CN | 106933953 A | 1/2017 |
| CN | 106802945 A | 6/2017 |

(Continued)

*Primary Examiner* — Evan Aspinwall
(74) *Attorney, Agent, or Firm* — Cantor Colburn LLP; Teddi Maranzano

(57) ABSTRACT

Techniques for context-based keyword grouping for business rule mining are described herein. An aspect includes determining, based on a first corpus, a first list of keywords. Another aspect includes constructing a co-occurrence matrix based on the first list of keywords. Another aspect includes applying a clustering algorithm to the co-occurrence matrix to determine a first plurality of keyword groups. Another aspect includes presenting the first plurality of keyword groups to a user via a user interface.

20 Claims, 9 Drawing Sheets

(56) References Cited

U.S. PATENT DOCUMENTS

| | | | | |
|---|---|---|---|---|
| 2018/0293978 A1* | 10/2018 | Sinha | .................... | G06N 7/005 |
| 2018/0300315 A1* | 10/2018 | Leal | .................... | G06F 40/268 |
| 2021/0064703 A1* | 3/2021 | Roy | .................... | G06F 40/284 |
| 2021/0232766 A1* | 7/2021 | Dhingra | .................. | G06F 17/16 |

FOREIGN PATENT DOCUMENTS

| | | |
|---|---|---|
| CN | 107194167 A | 9/2017 |
| JP | 2003296508 A | 10/2003 |

\* cited by examiner

≡ IBM ADI  [Search WorkBook  x 🔍]  🔔 | 😊 Scott ⌄

< Demo: AD OM CC  400
Review the summary charts for each contributing data provider. Many charts and chart groupings provide a more detailed breakdown when selected. >
Static Analysis   Code Coverage   Performance   Business Rules Discovery

Overview | Keywords Exploration | Business Terms | Business Rule Packages

Keywords associated to Business Terms

| 19 | 35 | 1M | 302 | 210 | 54 |
|---|---|---|---|---|---|
| ☐ from Source Code (AD) | ☐ from Enterprise Artifacts | Keywords from Source Code (AD) | Keywords from Enterprise Artifacts | Associated Snippets | Business Terms |

Keywords Exploration

Application Discovery | Enterprise Artifacts
⦿ Group by Similarity  ○ Group by Relatedness

[Search]    [Discovery Configuration Template]

| Keyword Name | Usage in Artifacts | Number of Artifacts | Business Terms Associated | Associated in Application Discovery | | Business Terms | |
|---|---|---|---|---|---|---|---|
| ⌄ patient-id (4) | 36 | 7 | 0 | | | > Dateofbirth | ... |
| patientid | 12 | 1 | 0 | ⊘ | | > Equipment | ... |
| ca-patient-id | 2 | 1 | 0 | ⊘ | | > heart rate | ... |
| patienT_id | 6 | 2 | 0 | | | > Last Name | ... |
| patient_id | 15 | 2 | 0 | ⊘ | | > Patient Id | ... |
| pat_id | 1 | 1 | 0 | | | > Patient Status | ... |
| ⌄ ca-bp-threshold (3) | 6 | 4 | 0 | | | > First name | ... |
| ⌄ insurance-numb (4) | 10 | 10 | 0 | ⊘ | | > equipment provider | ... |
| ⌄ equipment-charges (3) | 23 | 4 | 0 | | | > patient id | ... |
| ⌄ ca-data (2) | 8 | 2 | 0 | | | > Lab charges | ... |
| | | | | | | > patient id | ... |
| | | | | | | > Lab charges | ... |

FIG. 4

≡ IBM ADI [Search WorkBook ×|Q]                                                                                    ⚘ | ⓘ Scott ∨

< Demo: AD OM CC
Review the summary charts for each contributing data provider. Many charts and chart groupings provide a more detailed breakdown when selected. >
Static Analysis   Code Coverage   Performance   Business Rules Discovery Overview  Keywords  Exploration  Business Terms  Business Rule Packages

Business Term Status

16% Approved ▬▭▭▭▭

| 85 | 25 | 60 | 10 |
|---|---|---|---|
| Total | With Artifact Relationships | Without Artifact Relationships | With Associated Snippets |

Business Terms

[Search 🔍]                                                                    [Create New ∨] ↵

| Business Term | Definition | N° of Artifacts Relationships | N° of Snippets Associated | Implementation Names | Status | | Business Term |
|---|---|---|---|---|---|---|---|
| ☐ Admitted | | 8 | 3 | Ca-admitted, DB2-admitted | In progress | ∨ ✎ | Folder 🗑 |
| ☐ Bloodpressure | | 4 | 2 | Blood, ca-bloodpressure | Approved | ∨ ✎ 🗑 |
| ☐ DateofBirth | Patient birth date | 13 | 0 | DOB, ca-dob, Date-of-Birth | In progress | ∨ ✎ 🗑 |
| ☐ Insurance card number | Patient insurance number | 5 | 2 | patnumber, ins-pat-number | New | ∨ ✎ 🗑 |
| ☐ Patient | | 8 | 3 | Ca-admitted, DB2-admitted | In progress | ∨ ✎ 🗑 |
| ☐ pressure | | 4 | 2 | Blood, ca-bloodpressure | Waiting for approval | ∨ ✎ 🗑 |
| ☐ Birthday | Patient birth date | 13 | 0 | DOB, ca-dob, Date-of-Birth | Approved | ∨ ✎ 🗑 |
| ☐ First name | Patient insurance number | 5 | 2 | patnumber, ins-pat-number | Waiting for approval | ∨ ✎ 🗑 |

Showing 1-10 of 85 items   First Page | Previous Page | Next Page

FIG. 6

≡ IBM ADI  [Search WorkBook    x | q]                                                      ♢ | 🌐 Scott ⌄

< Demo: AD ON CC
Review the summary charts for each contributing data provider. Many charts and chart groupings provide a more detailed breakdown when selected. >     700
Static Analysis    Code Coverage    Performance    Business Rules Discovery

Overview    Keywords Exploration    Business Terms    Business Rule Packages

Business Term Status
[▭▬▬▬▬▬▬▬▬▬]
16% Approved

| 85 | 25 | 60 | 10 |
|---|---|---|---|
| Total | With Artifact Relationships | Without Artifact Relationships | With Associated Snippets |

Business Terms   ⦿ Flat list view   ○ Group view                          [Search        q]  [⇥]

| Business Term | Description | N° of Artifacts Relationships | N° of Snippets Associated | Implementation Names | Status | Actions |
|---|---|---|---|---|---|---|
| ☐ Admitted | | 8 | 3 | Ca-admitted, DB2-admitted | In progress ⌄ | ✎ 🗑 |
| ☐ Bloodpressure | | 4 | 2 | Blood, ca-bloodpressure | Approved ⌄ | ✎ 🗑 |
| ☐ DateofBirth | Patient birth date | 13 | 0 | DOB, ca-dob, Date-of-Birth | In progress ⌄ | ✎ 🗑 |
| ☐ Insurance card number | Patient insurance number | 5 | 2 | patnumber, ins-pat-number | New ⌄ | ✎ 🗑 |
| ☐ Patient | | 8 | 3 | Ca-admitted, DB2-admitted | In progress ⌄ | ✎ 🗑 |
| ☐ pressure | | 4 | 2 | Blood, ca-bloodpressure | Waiting for approval ⌄ | ✎ 🗑 |
| ☐ Birthday | Patient birth date | 13 | 0 | DOB, ca-dob, Date-of-Birth | Approved ⌄ | ✎ 🗑 |
| ☐ First name | Patient first name | 5 | 2 | patnumber, pat-name | Waiting for approval ⌄ | ✎ 🗑 |

Showing 1-10 of 85 items    First Page | Previous Page | Next Page

FIG. 7

≡ IBM ADI [Search WorkBook  x|q]  △ | ⊕ Scott ›

‹ Demo: AD OM CC  800
Review the summary charts for each contributing data provider. Many charts and chart groupings provide a more detailed breakdown when selected. ›
Static Analysis  Code Coverage  Performance  Business Rules Discovery Overview  Keywords Exploration  Business Terms  Business Rule Packages

Business Term Status
16% Approved

| 85 | 25 | 60 | 10 |
|---|---|---|---|
| Total | With Artifact Relationships | Without Artifact Relationships | With Associated Snippets |

Business Terms  ○ Flat list view  ● Group view

[▥] [Move] [Search                q]

| Business Term | Description | N° of Artifacts Relationships | N° of Snippets Associated | Implementation Names | Status | Actions |
|---|---|---|---|---|---|---|
| › □ Admitted | | | | | | |
| □ Bloodpressure | | 4 | 2 | Blood, ca-bloodpressure | Approved › | ✎ 🗑 |
| □ Dateofbirth | Patient birth date | 13 | 0 | DOB, ca-dob, Date-of-Birth | In progress › | ✎ 🗑 |
| □ Patient | Patient name | 5 | 2 | patnumber, ins-pat-number | New › | ✎ 🗑 |
| ∨ □ Insurance Policy | | | | | | |
| ∨ □ Insurance | | | | | | |
| ☑ InsuranceNumb | | 4 | 2 | insnumb, insurance-pol | Waiting for approval › | ✎ 🗑 |
| ☑ Policy Numb | Policy number | 13 | 0 | pol-numb, insurance-numb | Approved › | ✎ 🗑 |
| □ Tester Patient | | 5 | 2 | | Waiting for approval › | ✎ 🗑 |

Showing 1-10 of 85 Items  First Page | Previous Page | Next Page

FIG. 8

CONTEXT-BASED KEYWORD GROUPING

BACKGROUND

The present invention relates to business rule mining and, more specifically, to context-based keyword grouping for business rule mining.

Business rule mining is a process of discovering business logic, such as how car insurance premiums are calculated or how medical records are registered, incorporated into application code. Mining business rules can be particularly difficult in legacy applications, such as those including mainframe COBOL artifacts. Legacy applications can be old and complex, and may not be organized and maintained in the same ways that new or smaller applications might be. Discovered business rules can be converted into natural language and analyzed by business analysts or architects, so that they can be validated, tracked, and updated over time.

An early step in discovering business rules is identifying keywords in legacy applications, as business rules usually incorporate keywords. However, artifacts of legacy applications are not necessarily easy to understand by business analysts, and a legacy application may include a massive number of artifacts. Software developers follow specific programming language syntax, grammars, and conventions to compose the artifacts, and these must be translated into keywords and business logic before business analysts can begin to understand legacy applications.

SUMMARY

Embodiments of the present invention are directed to context-based keyword grouping for business rule mining. A non-limiting example computer-implemented method includes determining, based on a first corpus, a first list of keywords. The method also includes constructing a co-occurrence matrix based on the first list of keywords. The method also includes applying a clustering algorithm to the co-occurrence matrix to determine a first plurality of keyword groups. The method also includes presenting the first plurality of keyword groups to a user via a user interface.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a diagram of a user interface for context-based keyword grouping in accordance with one or more embodiments of the present invention;

FIG. 6 is a diagram of a user interface for context-based keyword grouping in accordance with one or more embodiments of the present invention;

FIG. 7 is a diagram of a user interface for context-based keyword grouping in accordance with one or more embodiments of the present invention;

FIG. 8 is a diagram of a user interface for context-based keyword grouping in accordance with one or more embodiments of the present invention.

DETAILED DESCRIPTION

Figure 1:
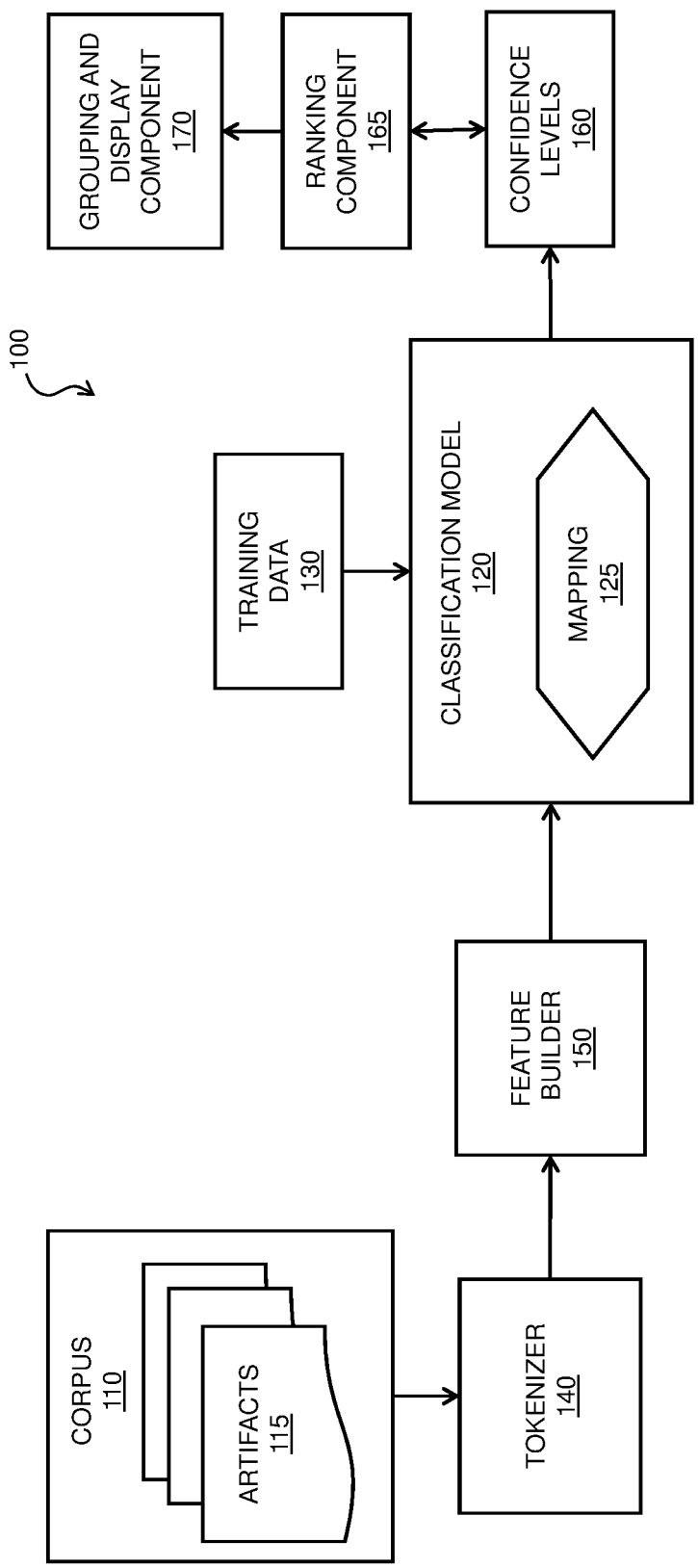
FIG. 1 is a block diagram of components of a system for context-based keyword grouping in accordance with one or more embodiments of the present invention.

One or more embodiments of the present invention provide context-based keyword grouping. Keywords may be discovered in programming source code files and enterprise artifacts, such as business documents or technical documents. Such automatically discovered keywords could be potential implementation names of business terms or even business terms themselves. Keywords that are presented in flat list or word edit-distance based groups may be difficult to understand and process for end users when the size of the keyword list is relatively large. A user may need to manually craft conceptual folders to group the discovered keywords or business terms, and such a manual process may be time-consuming. Discovered keywords and business terms may be automatically grouped based on context, which may be determined based on a co-occurrence matrix and/or Latent Dirichlet Allocation (LDA) analysis. Such keyword grouping may reduce the manual effort required by a user to group keywords or business terms into groups or folders. A user interface may present the grouped keywords and business terms to the user, and may present the user with options for keyword grouping.

Definitions of some terms used herein to describe embodiments of context-based keyword grouping are listed below:

Business rule discovery—the process of identifying business logic implemented in, for example, enterprise artifacts or computer code of an application that matches a business decision that the application is taking.

Business term—a relatively short concise name for a business concept that is part of an application logic, e.g. credit score, credit limit, card expiration date, personal identification number (PIN) code, annual salary, or customer age.

Keyword—a relatively concise token, word, or phrase discovered in textual artifacts, which is associated with an elemental concept of a business rule or implementation of a business rule. For example, keywords in program files may be variables with relatively high usages, and keywords in enterprise artifacts (e.g., any business related documents, such as documentation, requirement documents, presentation slides, spreadsheet, etc.) may be potential candidates for business terms. Keywords may be discovered manually or automatically using an algorithm in various embodiments.

Business rule—a business decision that evaluates one or more business term values and executes a sequence of actions with a result, e.g. extend credit limit on credit card: for customer profiles wherein a customer is above age 45, their annual salary is above 50 thousand (K) dollars, and their credit score is above 78, then allow extended credit limit up to 20 percent (%) of annual salary.

Business rule package—a collection of business rule related elements, such as business terms, keywords, and code fragments that make up a programmatic implementation of the business rule.

Business applications may have business logic and rules embedded in computer code. Business logic is added throughout the evolution of a business application, and after a relatively long time (e.g., 20-30 years) of maintenance, a business application may include a relatively large number (e.g., up to thousands) of business decisions throughout many programs and lines of code that make up the business application. Identifying business terms and mapping business rules in a relatively large business application may be a complex process. Automated business rule discovery may allow reuse, replacement, or modernizing of business logic in a business application in a relatively fast and accurate manner. In a corpus of structured or unstructured documents, a set of words that are of interest to the business term discovery process (i.e., keywords) may comprise a relatively small percentage of the total number of words. Usage frequency of a word might indicate that the word is a keyword, e.g., the word 'patient' in hospital related documents. However, some frequently used words, like 'assign' or 'move', may not be keywords of interest to business term discovery because they are programming language specific elements, (for example, in COBOL), and therefore are not business terms.

To discover potential business terms, specific uses of words may be identified, and weights may be assigned to each usage. The weights may be used to calculate a score and rank the discovered words to help identify which can be considered keywords, and further considered to be business terms or business term implementation names. Some examples of such specific usages that may be weighted include, but are not limited to: usage of a word in conditional language statements, usage of a word in computations, usage of a word in a user interface, and usage in file input/output (I/O), database, message queues, programs or documentation artifacts. A user may define application-specific usages to be identified, and assign each usage a weight. Keyword ranking may be calculated based on the identified usages and weights. A search parameter may be used to define a specific combination of search terms (if the search pattern is known) to further limit a set of business term candidates.

Discovered keywords may be approved as business terms by a user. The user may put an item in a "new" state and seek approval from, for example, a business and/or technical expert to move the state from "new" to "in progress", to "waiting for approval", and finally to "approved" or "rejected". A user may promote a ranked keyword to be implementation name of a business term or business term itself. Depending on the context of the discovered keyword, the user may then point out which piece of program code is related to a business term and/or may be part of a business rule. A user may also import existing business terms from a file, or create business terms based on subject matter expertise of the user. After building the collection of business terms and associated implementation names, the user may associate code snippets with the business terms in order to group business terms, their implementation names, and code associations into business rule packages representing the discovered business rules.

Artificial intelligence (AI) or machine learning (ML) may be used to determine groups of keywords that share similar business attributes or belong to the same or similar context (e.g., terms related to loans, credit cards business area, policy attributes, etc.). Any groups containing a relatively high percentage of already defined business terms may be identified, which may imply that the other keywords in such groups are likely candidates to be business terms as well. The groups may also reveal new sub-areas of logic which may not have been discovered yet, and that may be mapped to business terms and be identified as participating in business rules. Information regarding user confirmed business terms and their implementation names may be used as a filter for grouping analysis to reduce the vocabulary size. In some embodiments, only keywords that are similar or identical to already identified business terms and implementation names may be processed by the grouping analysis.

Grouping of keywords may be determined based on a co-occurrence matrix or refined Latent Dirichlet Allocation (LDA) modeling analysis in various embodiments. A co-occurrence matrix may be built for terms that were determined based on a corpus (e.g., program source code or unstructured enterprise artifacts). To reduce the co-occurrence matrix dimensions, only discovered keywords from a ranked keyword list may be used as the rows and columns of the co-occurrence matrix in some embodiments. Each entry in the co-occurrence matrix may be a context similarity metric (e.g., a number of times the two terms corresponding to the entry are found in the same context in the corpus). The keywords or terms may be grouped by applying a clustering algorithm (such as K-means) to the co-occurrence matrix. In order to apply LDA analysis to a set of keywords, a number of topics may be defined based on the business rule discovery. A number of business rule packages may be used to determine a total number of topics. Irrelevant or unimportant words in the corpus may induce noise into the LDA analysis; therefore, an importance score or keyword likelihood may be used to reduce the matrix dimensions in LDA. Further, LDA may be limited to a user-confirmed business term list to reduce matrix dimensions in some embodiments.

Turning now to a more detailed description of aspects of the present invention, FIG. 1 is a block diagram of a discovery and display system 100 according to one or more embodiments of the invention. System 100 may be implemented in conjunction with any appropriate computer system, such as computer system 900 of FIG. 9. Discovery and display system 100 is configured to predict, or determine, which terms in one or more artifacts 115 of corpus 110 are keywords, and to group the discovered keywords for display to a user. In some embodiments of the present invention, corpus 110 represents the source code of an application, such as a legacy application, that is being analyzed. In some embodiments, corpus 110 includes a body of unstructured enterprise artifacts (e.g., any appropriate business related or technical documents). In some embodiments of the present invention, discovery and display system 100 includes a classification model 120, in which classification model 120 is trained with training data 130 to produce a mapping 125. In some embodiments of the present invention, classification model 120 produces mapping 125 by mapping a feature vector, which is associated with a term identified in an artifact 115, to a confidence level 160 (e.g., confidence score), in which confidence level 160 represents a likelihood that the associated term is a keyword.

In some embodiments of the present invention, discovery and display system 100 includes a tokenizer 140 and a feature builder 150, which together generate input for the classification model 120 based on one or more artifacts 115. Generally, tokenizer 140 is configured to extract candidate terms from artifacts 115 of corpus 110, and feature builder 150 is configured to build a feature vector for each candidate term. Each of the tokenizer 140 and the feature builder 150 may include hardware, software, or a combination of both. For instance, each of the tokenizer 140 and the feature builder 150 may be a software module or a specialized hardware circuit. Each candidate term and its associated feature vector may be submitted to the classification model 120, which may output a confidence level 160 indicating whether the candidate term is a keyword.

In some embodiments of the present invention, tokenizer 140 is configured to take as input one or more artifacts 115 and output a plurality of terms. In other words, in some embodiments of the present invention, tokenizer 140 tokenizes artifacts 115. In some embodiments, each artifact 115 is a document of a set of unstructured enterprise artifacts. In some embodiments of the present invention, each artifact 115 is a source file or portion of a source file that is incorporated into a program, such as a legacy application. For example, and not by way of limitation, in some embodiments of the present invention, artifact 115 is a source code file, a MAP file, a copybook, or a library. In some embodiments of the present invention, a term is a one-word phrase representing an entity or concept in artifact 115. For example, and not by way of limitation, in some embodiments of the present invention, a term is a variable name, a constant value, a symbol, or a word in comments. In some embodiments of the invention, tokenizer 140 is, or incorporates, a scanner or parser that allows for parsing text such as computer code as known in the art. Existing scanners and parsers are able to extract terms from artifacts 115.

Some terms are reserved in certain languages. For example, the terms "public," "private," and "class" are reserved in the programming language Java, while the terms "a," "an," and "the" are reserved in the English language as stop words. These reserved terms typically do not convey useful or substantive information, but they serve a purpose such as annotation or to provide contextual or structural information within the programming language. In some embodiments of the present invention, discovery and display system 100 assumes that reserved terms are not keywords, and thus tokenizer 140 removes reserved terms from consideration. This may require knowledge of the programming languages used in artifacts 115. Thus, in some embodiments of the present invention, tokenizer 140 has access to a list of reserved terms in each programming language to enable recognition of those terms. In some embodiments of the present invention, reserved terms are ignored when terms are being extracted, or alternatively, reserved terms may be removed from the set of terms identified after terms are extracted from the artifact 115. The remaining terms, which are not reserved, are referred to as candidate terms. For instance, an example COBOL statement is as follows: "MOVE DB2-PATIENT-ID TO CA-PATIENT-ID. COPY HCERRSPD." After tokenization, including the removal of the reserved terms MOVE, TO, and COPY, the remaining candidate terms are the following: {DB2-PATIENT-ID, CA-PATIENT-ID, HCERRSPD}.

Feature builder 150 is configured to input one or more terms, which may be candidate terms, and to output a feature vector for each term. In some embodiments of the present invention, the feature vector is an ordered set of feature values, including a respective value in each field, in which each field represents a specific feature. In some embodiments of the present invention, the feature is a measurable property or metric. In some embodiments of the present invention, feature builder 150 is configured to examine the various artifacts 115 to evaluate the features to be included in the feature vector. Because each feature is a measurable property, one of skill in the art will understand how to construct feature builder 150 to establish the value of each feature for each term. Informative, discriminating, and independent feature vectors can be useful in differentiating important terms from unimportant ones. In some embodiments of the present invention, each feature represented in a feature vector is a factor that is being considered for determination of whether terms are keywords.

In some embodiments of the present invention, the features represented in a feature vector include a subset of language-independent features and language-dependent features. The language-independent features are independent of the programming language in which a term is written, and may be natural language features. In embodiments in which artifacts 115 are enterprise artifacts, the artifacts 115 may be written in natural language. In embodiments in which artifacts 115 are source code, artifacts 115 are written either directly or indirectly by humans, and thus certain features are related to characteristics of natural language, regardless of the specific language in which artifact 115 is written. In contrast, language-dependent features are relevant to a specific programming language. Syntax, styles, and conventions vary across programming languages. Thus, accuracy can be improved in discovering keywords by the consideration of language-dependent features that are selected with awareness of an applicable programming language. While the features considered as a whole may vary from one embodiment of the present invention to another, the language-dependent features may further vary based on the program languages of artifacts 115. In some embodiments of the present invention, only language independent features are utilized, or only language-dependent features are utilized. In some embodiments of the present invention, language independent features and/or language-dependent features are utilized.

In some embodiments of the present invention, the features that are represented in a feature vector are one or more of the following: term length, term frequency (i.e. the number of occurrences), document frequency, first appearance, and/or term frequency-inverse document frequency (TF-IDF). In some embodiments of the present invention, the features that are represented in a feature vector are one or more of the following for artifacts 115 written in COBOL: relatedness to a copybook, relatedness to a database, relatedness to business logic, and relatedness to imported keywords.

In some embodiments of the present invention, relatedness to a copybook refers to a measurement of similarity between a term in question and a COBOL copybook file. A copybook is an artifact 115 that defines data elements referenced by other artifacts 115. A term that is related to a copybook is likely to be a keyword. To determine relatedness to a copybook, in some embodiments of the present invention, each term found in each copybook is compared to the term in question, and the greatest similarity between these comparisons may be used as the value of this feature. In some embodiments of the present invention, an edit distance, such as the Levenshtein distance, is used as the measure of similarity between terms when determining the value of this feature or others. Thus, in some embodiments of the present invention, the highest Levenshtein distance between the term in question and each of the various terms in the copybooks of corpus 110 is used as the value of this feature.

In some embodiments of the present invention, relatedness to business logic statements refers to the similarity between a term in question in various business logic statements that are identified in the corpus 110. If a term is involved in a business logic statement, then it is likely to be a keyword. For instance, in some embodiments of the present invention, a business logic statement appears in artifacts 115 as a conditional statement, a statement involving one or more tables or arrays, structured query language (SQL) statements, or other suitable statements. It will be understood that a mechanism for identification of a business logic statement in the artifacts 115 may vary between embodiments. As with relatedness to a copybook, in some embodiments of the present invention, the term in question is compared to each term found in each business logic statement and the highest similarity value is used as the value of this feature.

In some embodiments of the present invention, relatedness to imported keywords refers to the similarity between a term in question and known keywords. In some embodiments of the present invention, one or more keywords are known, due to having been submitted as keywords by a user or having been previously identified as keywords. As with relatedness to a copybook, in some embodiments of the present invention, the term in question is compared to each known keyword and the highest similarity value may be used as the value of this feature.

In some embodiments of the present invention, feature builder 150 is configured to construct a feature vector for each term received as input. The number of dimensions in the feature vectors, as well as the features incorporated, need not always be as described herein. Rather, the features described above as included in the feature vector are provided for illustrative purposes only, and it will be understood that the size and features of the feature vector may vary from one embodiment to another. In some embodiments of the invention, the features considered may be fixed through training of classification model 120 and assignment of confidence levels 160. However, a value of a feature for a particular term may be left unassigned, or null, if that value cannot be established. A feature vector may be viewed as a description of the corresponding term and may be used to determine the confidence level 160 that the term is a keyword. Specifically, the classification model 120 may map a feature vector for a term to a confidence level 160 for the term.

Discovery and display system 100 includes a ranking component 165. In some embodiments of the present invention, ranking component 165 is configured to determine a list of ranked keywords, in which ranking component 165 in combination with classification model 120 and confidence levels 160 facilitate the mapping of discovered keywords to a specific user model of terms. Ranking component 165 is configured to facilitate the mapping of the discovered keywords to a specific user model of terms in various ways via support with classification model 120 and the generated confidence levels 160. For example, in some embodiments of the present invention, ranking component 165 is configured to reduce a set of potential keywords by various ways of sorting, ranking, and filtering in response to receiving an input by a user.

For example, in some embodiments of the present invention, ranking component 165 is configured to reduce the set of potential keywords by ranking the set of potential matches based on the confidence levels 160 (e.g., confidence scores) that were calculated by classification model 120. In some embodiments of the present invention, the confidence levels 160 as established by classification model 120 based on a combination of factors such as an overall confidence of a term's qualification as being a representative term and on an automated mapping of the discovered keywords against business terms. In some embodiments of the present invention, the overall confidence of a term's qualification as being a representative term is determined based on various heuristics and on the amount of evidence that is available for the term in question (e.g., occurrences of the implementation name of the term and synonyms of the term). In some embodiments of the present invention, the automated mapping of the discovered keywords is a mapping of discovered keywords against business terms that is based on using a fuzzy-search based algorithm, in which keywords that map very well are ranked higher than the ones that do not map well.

In some embodiments of the present invention, ranking component 165 is configured to reduce the set of potential keywords by filtering the list of discovered keywords in response to receiving a text string from a user. For example, in some embodiments of the present invention, text strings may be entered by a user, and the text strings are used for sub-string filtering to allow for focusing on words that match a particular subset of strings. In some embodiments of the present invention, ranking component 165 is configured to annotate each keyword with all the evidence that is found for the keyword as well as potential synonyms that were automatically grouped with the keyword during the keyword discovery process.

In some embodiments, ranking component 165 may identify specific usages of words, and weights may be assigned to each usage. The weights may be used to calculate a score and rank the discovered words to help identify which can be considered keywords by ranking component 165, and further considered to be business terms or business term implementation names. Some examples of such specific usages that may be weighted include, but are not limited to: usage of a word in conditional language statements, usage of a word in computations, usage of a word in a user interface, and usage in file input/output (I/O), database, message queues, programs or documentation artifacts. A user may define application-specific usages to be identified, and assign each usage a weight. Keyword ranking may be calculated based on the identified usages and weights by ranking component 165. A search parameter may be used to define a specific combination of search terms (if the search pattern is known) to further limit a set of business term candidates.

Ranking component 165 may receive input from a user. For example, in some embodiments, a user may promote a ranked keyword to be an implementation name of a business term or business term itself. Depending on the context of the discovered keyword, the user may specify a piece of program code is related to a business term and/or may be part of a business rule. A user may also import existing business terms from a file, or create business terms based on subject matter expertise of the user. After building the collection of business terms and associated implementation names, the user may associate code snippets with the business terms in order to allow grouping of business terms, their implementation names, and code associations into business rule packages representing the discovered business rules. In some embodiments, discovered keywords may be approved as business terms by a user via ranking component 165. The user may put an item in a "new" state and seek approval from, for example, a business and/or technical expert to move the state from "new" to "in progress", to "waiting for approval", and finally to "approved" or "rejected".

Grouping and display component 170 may receive a ranked keyword list from ranking component 165, and group the ranked keywords based on context analysis. Any groups that include relatively high numbers of already-defined business terms may be identified by grouping and display component 170, as this may indicate that the other keywords in the group are also likely to be business terms. The groups may also reveal new areas of interest where business rule logic and business terms might be found. Information regarding user confirmed business terms and their implementation names may be used as a filter for grouping to reduce the vocabulary size for the grouping by grouping and display component 170. In some embodiments, only keywords that are similar or identical to already identified business terms and implementation names may be grouped by grouping and display component 170. Grouping and display component 170 may implement a co-occurrence matrix as described by method 200 of FIG. 2, and/or LDA analysis as described by method 300 of FIG. 3, which are discussed below, to perform the grouping of the keywords. In some embodiments, a type of grouping applied to the list of ranked keywords by grouping and display component 170 may be determined based on a type of the corpus 110. In some embodiments, for a corpus 110 comprising source code, a co-occurrence matrix corresponding to method 200 of FIG. 2 may be applied to determine the keyword groupings, while for a corpus 110 comprising enterprise artifacts, LDA analysis corresponding to method 300 of FIG. 3 may be applied to determine the keyword groupings. The determined groupings of keywords may be presented to a user via a user interface (UI) of grouping and display component 170. Embodiments of UIs that may be presented to a user by grouping and display component 170 are illustrated with respect to FIGS. 4-8, which are discussed below. The grouping and display component 170 may also receive user input via the UI, and may change the determined groupings based on the received user input.

In some embodiments of the present invention, grouping and display component 170 includes hardware, software, or a combination of both. For instance, in some embodiments of the present invention, grouping and display component 170 is software module or a specialized hardware circuit.

Figure 2:
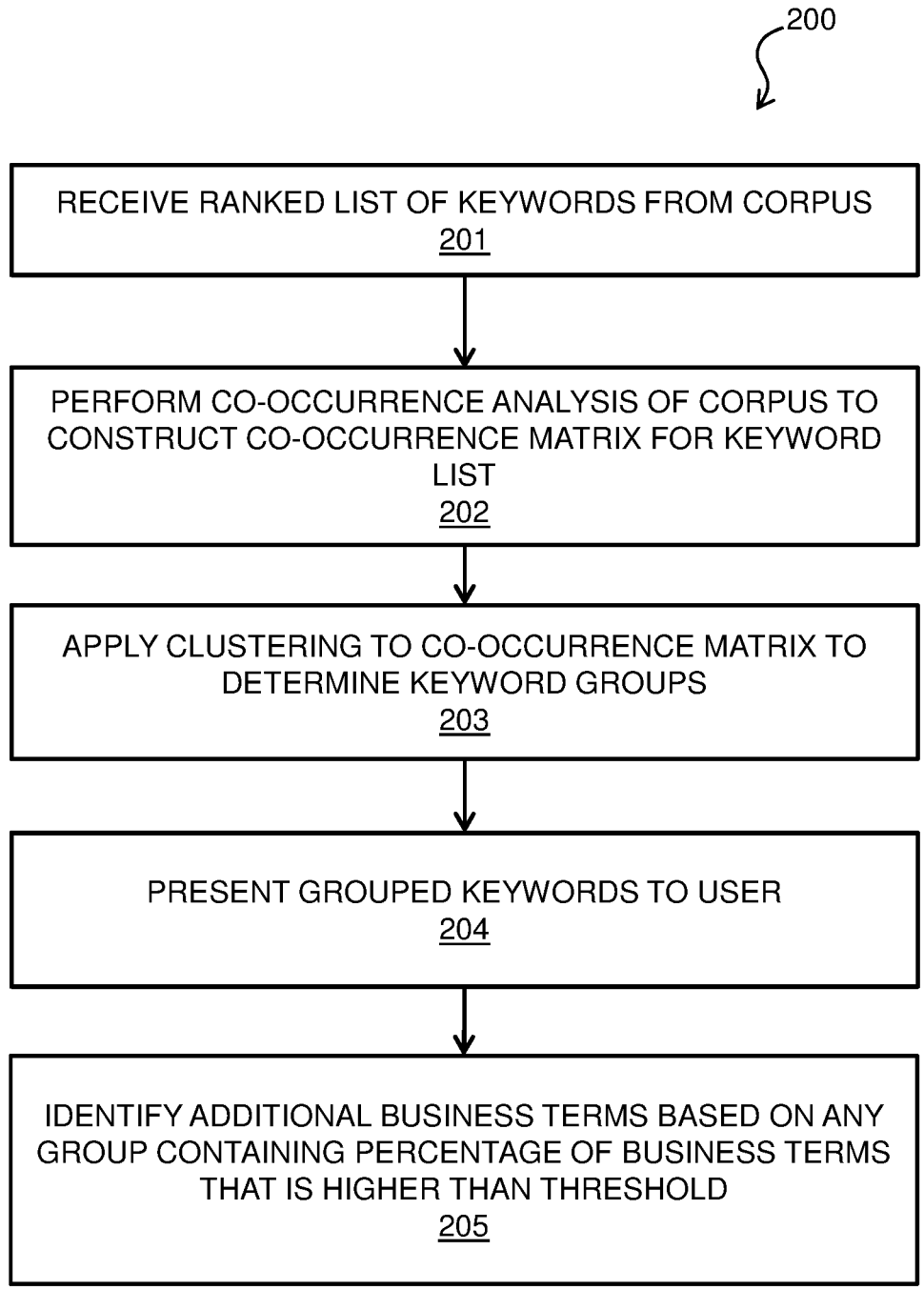
FIG. 2 is a flow diagram of a process for context-based keyword grouping using a co-occurrence matrix in accordance with one or more embodiments of the present invention.

FIG. 2 shows a process flow diagram of a method 200 for context-based keyword grouping using a co-occurrence matrix in accordance with one or more embodiments of the present invention. Embodiments of method 200 may be implemented in grouping and display component 170 of FIG. 1. In some embodiments, grouping and display component 170 may perform method 200 based on a type of the corpus 110; e.g., for a corpus 110 comprising source code, method 200 of FIG. 2 may be applied to determine keyword groupings. In block 201 of method 200, grouping and display component 170 of FIG. 1 receives a list of ranked keywords from ranking component 165. The keywords may include keywords that were extracted from a corpus 110 comprising enterprise artifacts or source code in various embodiments. In block 202, a co-occurrence matrix is constructed based on the ranked keyword list. The list of keywords may be the rows and columns of the co-occurrence matrix, such that each entry of the co-occurrence matrix corresponds to a respective pair of keywords. To construct the co-occurrence matrix, the locations of usages of the keywords in the corpus 110 (e.g., program source code or unstructured enterprise artifacts) are identified in block 202 via static analysis of the corpus 110. Each element in the co-occurrence matrix may be a count of each instance of the respective pair of keywords appearing in the same context. For example, 'Ca-Patient-ID' and 'Patient-Cost' may appear in the same computational statement 10 times in the corpus 110, or 'Patient' and 'Cost' may appear in the same paragraph 10 times in the corpus 110.

In order to construct the co-occurrence matrix in block 202, keywords and the contexts in which they are determined to co-occur are defined. For program source code, context may be defined based on usage of keywords together in particular types of programing language statements (for example, conditional, computational, database I/O, file I/O, etc.). For a corpus comprising unstructured enterprise artifacts, context may be defined to exist based on existing business rules. If no business rules are available, usage of keywords together in the same sentence or paragraph may be determined to count as context. With the keywords and contexts defined, each entry value in the co-occurrence matrix gives a context similarity measurement for a respective pair of keywords. To reduce the matrix dimensions and vocabulary size, in some embodiments, only discovered keywords may be used as rows and columns of the co-occurrence matrix. In some embodiments of block 202, the ranked list of keywords may be filtered to reduce the size of the co-occurrence matrix; the filtering may be performed based on similarity to already-identified business terms or business rules corresponding to the corpus 110.

In block 203, a clustering algorithm is applied to the co-occurrence matrix that was constructed in block 202. Any appropriate clustering algorithm may be applied to the co-occurrence matrix in block 203, including but not limited to K-means clustering. In block 204, the keyword groupings that were determined in block 203 are presented by a UI to a user by grouping and display component 170. An example of a UI that may be displayed to a user in block 204 is illustrated with respect to FIG. 4, which is discussed below. In block 205, based on a particular keyword group including a relatively high percentage (e.g., higher than a threshold) of keywords that have been designated as business terms, it may be determined that other keywords in that keyword group are also business terms.

Table 1 illustrates an example embodiment of a co-occurrence matrix that may be constructed in block 202 according to embodiments of method 200 of FIG. 2. The co-occurrence matrix of Table 1 is constructed based on the following code snippet:

If (room-type="PRIVATE") (If statement)

room-cost=340*stay-days    (Calculation statement 1)

total-cost=medication-cost+room-cost    (Calculation statement 2)

TABLE 1

| Keywords | room-type | room-cost | stay-days | total-cost | Medication-cost |
| --- | --- | --- | --- | --- | --- |
| room-type | 0 | 0 | 0 | 0 | 0 |
| room-cost | 0 | 2 | 1 | 1 | 1 |
| stay-days | 0 | 1 | 1 | 0 | 0 |
| total-cost | 0 | 1 | 0 | 1 | 1 |
| Medication-cost | 0 | 1 | 0 | 1 | 1 |

As shown in Table 1, the keywords received in block 201 include room-type, room-cost, stay-days, total-cost, and Medication-cost. Any appropriate clustering algorithm may be applied to the co-occurrence matrix of Table 1 in block 203 of method 200.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
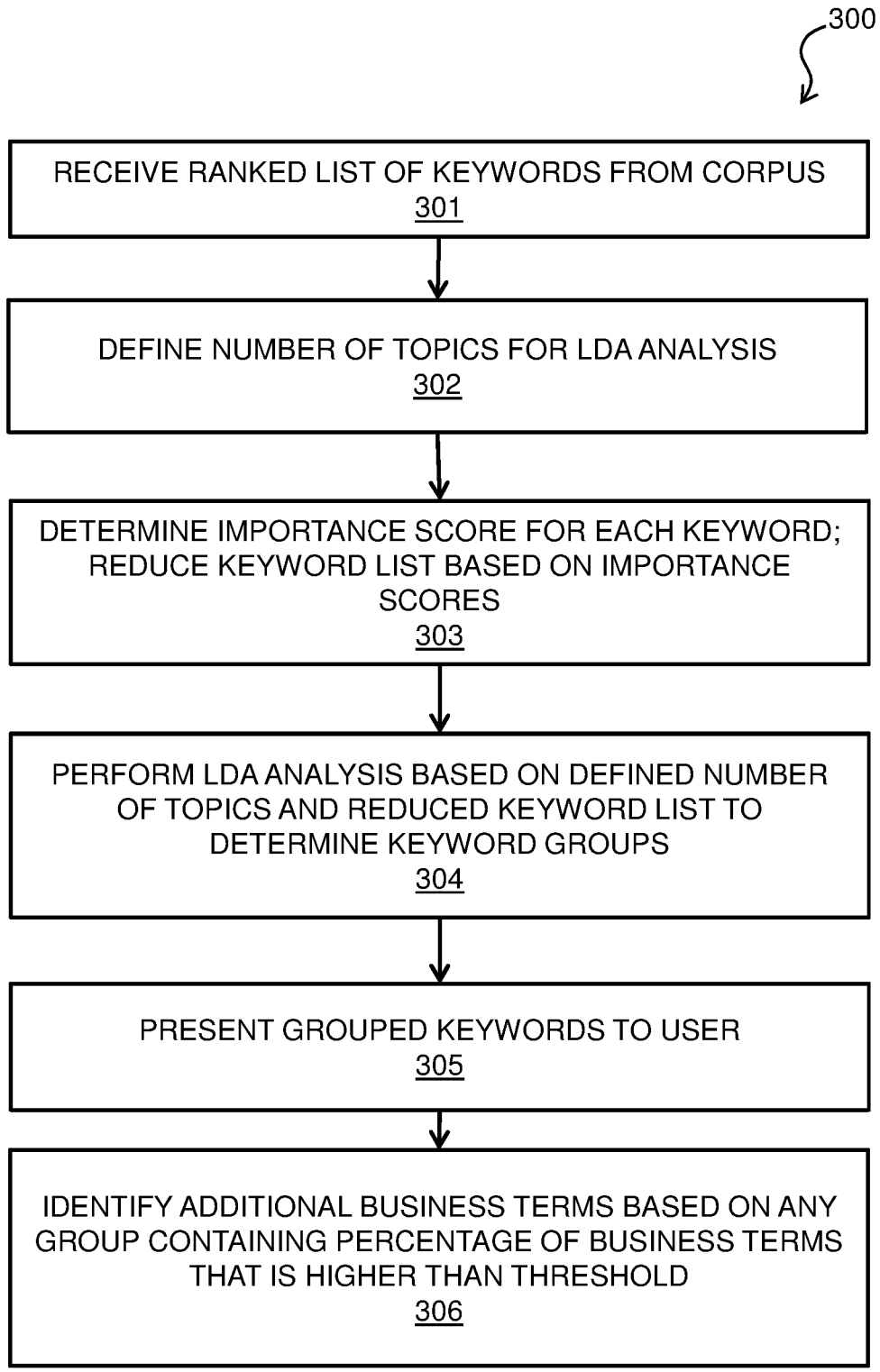
FIG. 3 is a flow diagram of a process for context-based keyword grouping using Latent Dirichlet Allocation (LDA) analysis in accordance with one or more embodiments of the present invention.

FIG. 3 shows a process flow diagram of a method 300 for context-based keyword grouping using LDA analysis in accordance with one or more embodiments of the present invention. Embodiments of method 300 may be implemented in grouping and display component 170 of FIG. 1. In some embodiments, grouping and display component 170 may perform method 300 based on a type of the corpus 110; e.g., for a corpus 110 comprising enterprise artifacts, method 300 of FIG. 3 may be applied to determine keyword groupings. In block 301 of method 300, grouping and display component 170 of FIG. 1 receives a list of ranked keywords from ranking component 165. The keywords may include keywords that were extracted from a corpus 110 comprising enterprise artifacts or source code in various embodiments. In block 302, a number of topics for LDA analysis of the ranked keywords is determined. In some embodiments, a number of existing business rule packages corresponding to the corpus may be used to determine the number of topics to be used for the LDA analysis. For example, sample business rule packages corresponding to a hospital-related corpus, such as PatientCost, Medication, Treatment, etc., may be used to determine a total number of topics in block 302.

In block 303, an importance score may be determined for each keyword in the ranked list in order to reduce the number of keywords that will be processed by the LDA analysis. Program domain independent features (e.g., document frequency, term frequency, etc.) may be used to determine the importance scores for a corpus 110 comprising generic documents (such as text documents or slide presentations). Programing language domain dependent features, such as usage in conditional statements or computational statements, may be used to determine the importance scores for a corpus comprising source code. User employed features, such as similarity of a keyword to any confirmed business terms, may also be used to determine an importance score for a keyword. With an importance score assigned to each keyword, a ranked list of keywords may be built, and LDA analysis may be applied to a set of top ranked keywords in block 303. The reduced keyword list that is determined in block 303 includes a subset of the keywords in the keyword list that was received in block 301. Any appropriate number of keywords may be selected to be included in the reduced keyword list in block 303. In some embodiments, the reduced keyword list that is used for the LDA analysis may be limited to user confirmed business terms in block 303 to reduce the number of keywords that are processed by the LDA analysis. Reduction of the keyword list, as is performed in block 303, may reduce an amount of noise present in the LDA analysis that may be induced by processing of irrelevant or unimportant terms.

In block 304, natural language processing comprising LDA analysis is performed on the corpus 110 using the reduced keyword list and the determined number of topics to determine keyword groupings. The LDA analysis of block 304 may include statistical modeling for discovering the hidden topics that occur in corpus 110. LDA analysis may assign keywords in the corpus 110 into a number of groups equal to the number of topics that was determined in block 302 based on usages and locations of the keywords in the corpus 110. Examples of keyword groups that may be output by LDA analysis and topic modeling, as is performed in block 304, are illustrated below with respect to Tables 1-4.

In block 305, the keyword groupings are presented by a user by grouping and display component 170. An example of a UI that may be displayed to a user in block 305 is illustrated with respect to FIG. 5, which is discussed below. In block 306, it may be determined that, based on a particular keyword group including a relatively high percentage (e.g., higher than a threshold) of keywords that have been designated as business terms, that other keywords in that keyword group are also business terms.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

An example output of keywords groups that may be determined using method 300 of FIG. 3 using LDA analysis to find hidden context groups, or topics, from a corpus comprising hospital related enterprise artifacts is illustrated below with respect to Tables 1-4. The number before each keyword in Tables 1-4 represents the keyword's relatedness measurement to the topic.

TABLE 1

Keyword Group for Topic 1:

(0, '0.024*"medication", 0.019*"error", 0.013*"insulin", 0.012*"drug", 0.009*"administration", 0.008*"patient", 0.008*"nurse", 0.008*"study", 0.007*"percent", 0.007*"pubmed", 0.006*"human", 0.006*"blood", 0.005*"regular", 0.005*"care", 0.005*"safety", 0.004*"sugar", 0.004*"wrong", 0.004*"dose", 0.004*"cause", 0.004*"type", 0.004*"rate", 0.004*"health", 0.003*"effect", 0.003*"system", 0.003*"hospital"')

Based on the included words, it may be determined that Topic 1 is related to a patient's medication in block 304 of FIG. 3.

TABLE 2

Keyword Group for Topic 2:

(1, '0.014*"xray", 0.009*"medicine", 0.008*"bone", 0.007*"patient", 0.006*"image" 0.006*"radiation", 0.006*"chest", 0.005*"medical", 0.005*"examination", TABLE 2-continued Keyword Group for Topic 2:

0.005*"procedure", 0.005*"right", 0.005*"physician", 0.004*"xrays",
0.004*"cholesterol", 0.004*"exam", 0.003*"body", 0.003*"imaging",
0.003*"treatment", 0.003*"page", 0.003*"bmd", 0.003*"hospital", 0.003*"used",
0.003*"risk", 0.003*"doctor", 0.003*"test", 0.003*"technologist", 0.002*"dose",
0.002*"lipid", 0.002*"taken", 0.002*"diagnosis"')

Based on the included words, it may be determined that Topic 2 is related to a patient x-ray exam in block 304 of FIG. 3.

TABLE 3

Keyword Group for Topic 3:

(2, '0.027*"urine", 0.015*"blood", 0.014*"test", 0.009*"insulin", 0.008*"cell",
0.007*"kidney", 0.007*"urinalysis", 0.006*"encancer", 0.005*"informationdiagnosis",
0.005*"glucose", 0.005*"protein", 0.005*"and", 0.005*"sample", 0.005*"disease",
0.005*"dose", 0.005*"regionon", 0.004*"urinary", 0.004*"result", 0.004*"sugar",
0.004*"cast", 0.004*"infection", 0.004*"example", 0.004*"diabetes", 0.004*"present",
0.003*"condition", 0.003*"tract", 0.003*"level", 0.003*"indicate", 0.003*"medical",
0.003*"high"')

Based on the included words, it may be determined that Topic 3 is related to a blood/urine lab test in block 304 of FIG. 3.

TABLE 4

Keyword Group for Topic 4:

(3, '0.019*"hospital", 0.013*"insurance", 0.013*"patient", 0.011*"health",
0.011*"service", 0.011*"care", 0.009*"room", 0.009*"inpatient", 0.006*"charge",
0.006*"plan", 0.005*"private", 0.005*"outpatient", 0.005*"cost", 0.005*"bill",
0.004*"pay", 0.004*"fee", 0.004*"card", 0.003*"resident", 0.003*"physician",
0.003*"admission", 0.003*"contact", 0.003*"medical", 0.003*"visit",
0.003*"coverage", 0.003*"provincial", 0.003*"general", 0.003*"accommodation",
0.003*"semiprivate", 0.002*"stay"')

Based on the included words, it may be determined that Topic 4 is related to inpatient admission or room charges in block 304 of FIG. 3.

Figure 5:
FIG. 5 is a diagram of a user interface for context-based keyword grouping in accordance with one or more embodiments of the present invention.

FIGS. 4-8 illustrate UIs 400, 500, 600, 700, and 800 for context-based keyword grouping in accordance with one or more embodiments of the present invention. FIG. 4 illustrates an embodiment of a UI 400 in which keywords are grouped based on similarity, i.e., using a co-occurrence matrix as is discussed above with respect to method 200 of FIG. 2. A UI such as UI 400 may be presented to a user by grouping and display component 170 of FIG. 1 in block 204 of method 200 of FIG. 2. The keywords displayed in a UI such as UI 400 may have been determined based on a corpus 110 comprising program source code in some embodiments. FIG. 5 illustrates an embodiment of a UI 500 in which keywords are grouped based on relatedness, i.e., using LDA analysis as is discussed above with respect to method 300 of FIG. 3. A UI such as UI 500 may be presented to a user by grouping and display component 170 of FIG. 1 in block 305 of method 300 of FIG. 3. The keywords displayed in a UI such as UI 500 may have been determined based on a corpus 110 comprising enterprise artifacts in some embodiments. Any UI of UIs 400 and 500 may be displayed by grouping and display component 170 of FIG. 1 based on input from a user, e.g., based on the user clicking on a tab in the UI.

FIG. 6 illustrates an embodiment of a UI 600 that allows a user to manually group discovered business terms based on cross referencing of keywords between program source code and enterprise artifacts. The groupings that are displayed in UI 400 and/or UI 500 may be recalculated based on user input that is received via UI 600. FIG. 7 illustrates an embodiment of a UI 700 in which business terms are displayed in a flat list view. The user may confirm business terms using the flat list of UI 700, and may manipulate the flat list (e.g., by editing, moving, or deleting terms) in order to change or manipulate the groupings that are displayed in UI 400 and/or UI 500. FIG. 8 illustrates an embodiment of a UI 800 in which confirmed business terms are displayed in a group view. Any UI of UIs 600, 700, and 800 may be displayed by grouping and display component 170 of FIG. 1 based on input from a user, e.g., based on the user clicking on a tab in the UI.

FIGS. 4-8 are shown for illustrative purposes only. A user interface that is displayed by embodiments of a grouping and display component 170 of FIG. 1 may include any appropriate user interface elements, including any appropriate number and type of keywords and keyword groupings, displayed in any appropriate manner.

Figure 9:
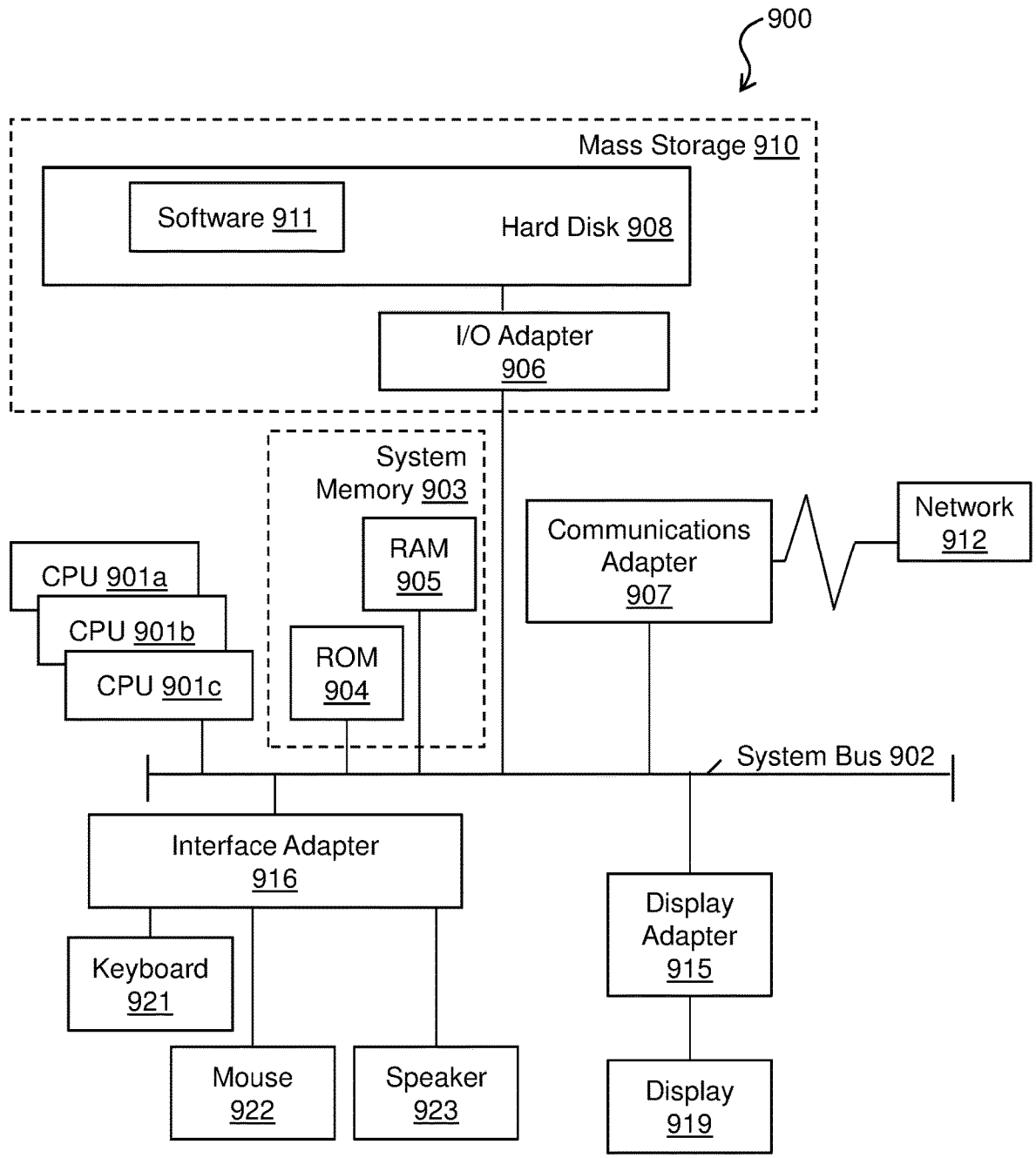
FIG. 9 is a block diagram of an example computer system for use in conjunction with one or more embodiments of context-based keyword grouping.

Turning now to FIG. 9, a computer system 900 is generally shown in accordance with an embodiment. The computer system 900 can be an electronic, computer framework comprising and/or employing any number and combination of computing devices and networks utilizing various communication technologies, as described herein. The computer system 900 can be easily scalable, extensible, and modular, with the ability to change to different services or reconfigure some features independently of others. The computer system 900 may be, for example, a server, desktop computer, laptop computer, tablet computer, or smartphone. In some examples, computer system 900 may be a cloud computing node. Computer system 900 may be described in the general context of computer system executable instructions, such as program modules, being executed by a computer system. Generally, program modules may include routines, programs, objects, components, logic, data structures, and so on that perform particular tasks or implement particular abstract data types. Computer system 900 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system 900 has one or more central processing units (CPU(s)) 901a, 901b, 901c, etc. (collectively or generically referred to as processor(s) 101). The processors 901 can be a single-core processor, multi-core processor, computing cluster, or any number of other configurations. The processors 901, also referred to as processing circuits, are coupled via a system bus 902 to a system memory 903 and various other components. The system memory 903 can include a read only memory (ROM) 904 and a random access memory (RAM) 905. The ROM 904 is coupled to the system bus 902 and may include a basic input/output system (BIOS), which controls certain basic functions of the computer system 900. The RAM is read-write memory coupled to the system bus 902 for use by the processors 901. The system memory 903 provides temporary memory space for operations of said instructions during operation. The system memory 903 can include random access memory (RAM), read only memory, flash memory, or any other suitable memory systems.

The computer system 900 comprises an input/output (I/O) adapter 906 and a communications adapter 907 coupled to the system bus 902. The I/O adapter 906 may be a small computer system interface (SCSI) adapter that communicates with a hard disk 908 and/or any other similar component. The I/O adapter 906 and the hard disk 908 are collectively referred to herein as a mass storage 910.

Software 911 for execution on the computer system 900 may be stored in the mass storage 910. The mass storage 910 is an example of a tangible storage medium readable by the processors 901, where the software 911 is stored as instructions for execution by the processors 901 to cause the computer system 900 to operate, such as is described herein below with respect to the various Figures. Examples of computer program product and the execution of such instruction is discussed herein in more detail. The communications adapter 907 interconnects the system bus 902 with a network 912, which may be an outside network, enabling the computer system 900 to communicate with other such systems. In one embodiment, a portion of the system memory 903 and the mass storage 910 collectively store an operating system, which may be any appropriate operating system, such as the z/OS or AI9 operating system from IBM Corporation, to coordinate the functions of the various components shown in FIG. 9.

Additional input/output devices are shown as connected to the system bus 902 via a display adapter 915 and an interface adapter 916 and. In one embodiment, the adapters 906, 907, 915, and 916 may be connected to one or more I/O buses that are connected to the system bus 902 via an intermediate bus bridge (not shown). A display 919 (e.g., a screen or a display monitor) is connected to the system bus 902 by a display adapter 915, which may include a graphics controller to improve the performance of graphics intensive applications and a video controller. A keyboard 921, a mouse 922, a speaker 923, etc. can be interconnected to the system bus 902 via the interface adapter 916, which may include, for example, a Super I/O chip integrating multiple device adapters into a single integrated circuit. Suitable 110 buses for connecting peripheral devices such as hard disk controllers, network adapters, and graphics adapters typically include common protocols, such as the Peripheral Component Interconnect (PCI). Thus, as configured in FIG. 9, the computer system 900 includes processing capability in the form of the processors 901, and, storage capability including the system memory 903 and the mass storage 910, input means such as the keyboard 921 and the mouse 922, and output capability including the speaker 923 and the display 919.

In some embodiments, the communications adapter 907 can transmit data using any suitable interface or protocol, such as the internet small computer system interface, among others. The network 912 may be a cellular network, a radio network, a wide area network (WAN), a local area network (LAN), or the Internet, among others. An external computing device may connect to the computer system 900 through the network 912. In some examples, an external computing device may be an external webserver or a cloud computing node.

It is to be understood that the block diagram of FIG. 9 is not intended to indicate that the computer system 900 is to include all of the components shown in FIG. 9. Rather, the computer system 900 can include any appropriate fewer or additional components not illustrated in FIG. 9 (e.g., additional memory components, embedded controllers, modules, additional network interfaces, etc.). Further, the embodiments described herein with respect to computer system 900 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a processor, based on a first corpus comprising logic for computer code, a first list of keywords;
   ranking, by the processor, the first list of keywords;
   constructing, by the processor, a co-occurrence matrix based on a ranking of the first list of keywords such that each entry in the co-occurrence matrix corresponds to a pair of keywords from the first list of keywords, wherein a count of each instance of the pair of keywords in the co-occurrence matrix relates to the first corpus;
   applying, by the processor, a clustering algorithm to the co-occurrence matrix to determine a first plurality of keyword groups; and
   presenting, by the processor, the first plurality of keyword groups to a user via a user interface, wherein the first plurality of keyword groups relate to the logic for modernizing the computer code, the first plurality of keywords groups further relating to at least one business decision executable by the computer code.

2. The method of claim 1, wherein the first corpus comprises application source code.

3. The method of claim 1, further comprising:
   filtering the first list of keywords to determine a first reduced keyword list; and
   constructing the co-occurrence matrix based on the first reduced keyword list.

4. The method of claim 1, further comprising:
   determining, based on a second corpus, a second list of keywords;
   performing latent Dirichlet allocation (LDA) analysis based on the second corpus and the second list of keywords to determine a second plurality of keyword groups; and
   presenting the second plurality of keyword groups to the user via the user interface.

5. The method of claim 4, wherein performing LDA analysis based on the second corpus and the second list of keywords to determine a second plurality of keyword groups comprises:
   defining a number of topics for the LDA analysis, wherein the number of topics is defined based on a number of business rule packages that are defined for the second corpus;
   determining a respective importance score for each keyword of the second list of keywords;

ranking the second list of keywords based on the determined importance scores;
determining a second reduced keyword list based on the ranked second list of keywords; and
performing the LDA analysis based on the defined number of topics and the second reduced keyword list.

6. The method of claim 4, wherein the second corpus comprises unstructured enterprise artifacts.

7. The method of claim 1, further comprising:
receiving input from the user via the user interface; and
modifying the first plurality of keyword groups based on the user input.

8. A system comprising:
a memory having computer readable instructions; and
one or more processors for executing the computer readable instructions, the computer readable instructions controlling the one or more processors to perform operations comprising:
determining, based on a first corpus comprising logic for computer code, a first list of keywords;
ranking, by the processor, the first list of keywords;
constructing a co-occurrence matrix based on a ranking of the first list of keywords such that each entry in the co-occurrence matrix corresponds to a pair of keywords from the first list of keywords, wherein a count of each instance of the pair of keywords in the co-occurrence matrix relates to the first corpus;
applying a clustering algorithm to the co-occurrence matrix to determine a first plurality of keyword groups; and
presenting the first plurality of keyword groups to a user via a user interface, wherein the first plurality of keyword groups relate to the logic for modernizing the computer code, the first plurality of keywords groups further relating to at least one business decision executable by the computer code.

9. The system of claim 8, wherein the first corpus comprises application source code.

10. The system of claim 8, further comprising:
filtering the first list of keywords to determine a first reduced keyword list; and
constructing the co-occurrence matrix based on the first reduced keyword list.

11. The system of claim 8, further comprising:
determining, based on a second corpus, a second list of keywords;
performing latent Dirichlet allocation (LDA) analysis based on the second corpus and the second list of keywords to determine a second plurality of keyword groups; and
presenting the second plurality of keyword groups to the user via the user interface.

12. The system of claim 11, wherein performing LDA analysis based on the second corpus and the second list of keywords to determine a second plurality of keyword groups comprises:
defining a number of topics for the LDA analysis, wherein the number of topics is defined based on a number of business rule packages that are defined for the second corpus;
determining a respective importance score for each keyword of the second list of keywords;
ranking the second list of keywords based on the determined importance scores;
determining a second reduced keyword list based on the ranked second list of keywords; and
performing the LDA analysis based on the defined number of topics and the second reduced keyword list.

13. The system of claim 12, wherein the second corpus comprises unstructured enterprise artifacts.

14. The system of claim 8, further comprising:
receiving input from the user via the user interface; and
modifying the first plurality of keyword groups based on the user input.

15. A computer program product comprising a computer readable storage medium having program instructions embodied therewith, the program instructions executable by a processor to cause the processor to perform operations comprising:
determining, based on a first corpus comprising logic for computer code, a first list of keywords;
ranking, by the processor, the first list of keywords;
constructing a co-occurrence matrix based on the first list of keywords such that each entry in the co-occurrence matrix corresponds to a pair of keywords from the first list of keywords, wherein a count of each instance of the pair of keywords in the co-occurrence matrix relates to the first corpus;
applying a clustering algorithm to the co-occurrence matrix to determine a first plurality of keyword groups; and
presenting the first plurality of keyword groups to a user via a user interface, wherein the first plurality of keyword groups relate to the logic for modernizing the computer code, the first plurality of keywords groups further relating to at least one business decision executable by the computer code.

16. The computer program product of claim 15, wherein the first corpus comprises application source code.

17. The computer program product of claim 15, further comprising:
filtering the first list of keywords to determine a first reduced keyword list; and
constructing the co-occurrence matrix based on the first reduced keyword list.

18. The computer program product of claim 15, further comprising:
determining, based on a second corpus, a second list of keywords;
performing latent Dirichlet allocation (LDA) analysis based on the second corpus and the second list of keywords to determine a second plurality of keyword groups; and
presenting the second plurality of keyword groups to the user via the user interface.

19. The computer program product of claim 18, wherein performing LDA analysis based on the second corpus and the second list of keywords to determine a second plurality of keyword groups comprises:
defining a number of topics for the LDA analysis, wherein the number of topics is defined based on a number of business rule packages that are defined for the second corpus;
determining a respective importance score for each keyword of the second list of keywords;
ranking the second list of keywords based on the determined importance scores;
determining a second reduced keyword list based on the ranked second list of keywords; and
performing the LDA analysis based on the defined number of topics and the second reduced keyword list.

20. The computer program product of claim 18, wherein the second corpus comprises unstructured enterprise artifacts.

* * * * *